United States Patent [19]
Conlan et al.

[11] Patent Number: 5,358,368
[45] Date of Patent: Oct. 25, 1994

[54] SCREW WITH IMPROVED HEAD DESIGN

[75] Inventors: Gary D. Conlan; Dennis Barber, both of Mansfield, Ohio

[73] Assignee: General Signal Corporation, Stamford, Conn.

[21] Appl. No.: 119,283

[22] Filed: Sep. 9, 1993

[51] Int. Cl.5 .............................................. F16B 35/06
[52] U.S. Cl. ...................................... 411/410; 411/403
[58] Field of Search ............... 411/919, 403, 404, 405, 411/410

[56] References Cited

U.S. PATENT DOCUMENTS

| | | | |
|---|---|---|---|
| 1,910,182 | 5/1933 | Robertson | 411/410 |
| 2,082,748 | 6/1937 | Brown | 411/410 |
| 2,173,707 | 9/1939 | Brown | 411/919 X |
| 2,289,561 | 7/1942 | West. | |
| 2,359,898 | 10/1944 | Clark | 411/404 |
| 2,395,476 | 2/1946 | Givnan | 411/410 |
| 2,556,155 | 6/1951 | Stellin | 411/410 |
| 3,177,506 | 4/1965 | Vellier | 411/919 X |
| 3,269,250 | 8/1966 | Curtiss | 411/410 |
| 3,304,561 | 2/1967 | Ellsworth | 411/403 X |
| 3,481,243 | 12/1969 | Gatz | 411/919 X |
| 5,020,954 | 6/1991 | Dreger. | |

FOREIGN PATENT DOCUMENTS

| | | | |
|---|---|---|---|
| 2361568 | 3/1978 | France | 411/410 |
| 622862 | 4/1981 | Switzerland. | |
| 2092253 | 8/1982 | United Kingdom | 411/403 |

Primary Examiner—Rodney M. Lindsey
Attorney, Agent, or Firm—Fay, Sharpe, Beall, Fagan, Minnich & McKee

[57] ABSTRACT

A screw having a driving socket capable of receiving a square socket (Robertson) type driver, a cross-recess (Phillips) type screw driver, and a flat blade driver.

6 Claims, 2 Drawing Sheets

SCREW WITH IMPROVED HEAD DESIGN

BACKGROUND OF THE INVENTION

The subject invention is directed toward the art of threaded metal fasteners and, more particularly, to such a fastener with an improved head design.

Threaded fasteners of the screw and bolt type are typically provided with tool receiving surfaces in or on their head end to facilitate holding or driving the fastener during installation or removal. There are numerous different arrangements varying from simple slots and recesses to unusual combinations of internal and external tool receiving surfaces. This, of course, results in a need for each craftsman or mechanic to constantly carry a plurality of different driving tools.

A primary object of the present invention is the provision of a head design wherein any of a plurality of different but relatively conventional driving tools can be used to drive a single fastener.

Another object is to provide a fastener with a head design that can receive any of a plurality of different driving tools but which retains a relatively high strength.

SUMMARY OF THE INVENTION

In accordance with the invention, a screw having an elongated threaded body with an axially aligned head including a driving socket capable of receiving a square (Robertson) type driver, a cross-recess (Phillips) type driver, and a flat blade driver is provided. The driving socket comprises a square socket recess that extends axially into the head to a depth h and is defined by four vertical walls which meet at four vertical, diagonally located corners. The recess is sized and arranged to receive a square (Robertson) type driver. Aligned slots extend radially outwardly on the diagonal from each of two of the diagonally located corners of the square recess. The aligned slots are sized and arranged for receiving a flat blade type drive, and each slot is defined by two parallel walls which extend into the head a distance of approximately one-half h to a transverse bottom wall. The vertical walls in each slot are aligned with those in the diagonally opposite slot. Additionally, four grooves extend diagonally outward from the corners of the square recess to define a cross-spaced recess to receive a cross-recess (Phillips) type screw driver. The grooves each are defined by a pair of vertical sides more closely spaced than the parallel walls defining the slots. An inclined bottom wall joins the sides at a distance into the head greater than one-half h but less than h. The grooves in the corners from which the diagonal slots extend are located centrally of the slots in the transverse bottom walls.

Preferably, the aligned slots arranged to receive the blade type driver extend completely across the head to its peripheral edge.

The arrangement of the various recesses, slots, and grooves which form the socket are such as to maintain a head of relatively high strength and structural integrity. The location of the slots relative to the square socket recess assures that forces applied to the sides of the slot during a tightening or holding operation are distributed into the head body into an area where the head is of maximum size to handle the forces applied.

BRIEF DESCRIPTION OF THE DRAWINGS

The above and other objects and advantages of the invention will become apparent from the following description when read in conjunction with the accompanying drawings wherein.

DETAILED DESCRIPTION OF THE PREFERRED EMBODIMENT

Figure 1:
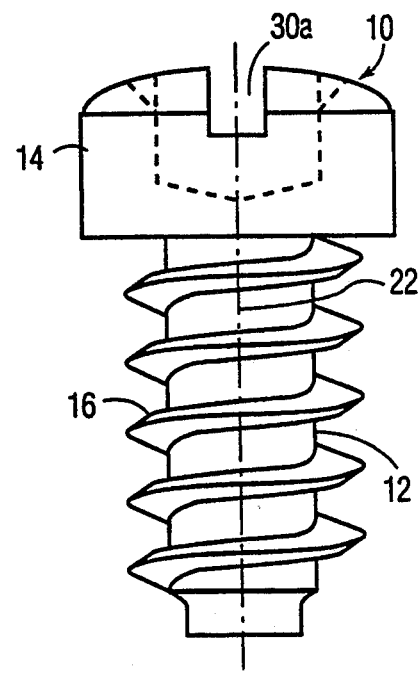
FIG. 1 is a side elevational view of a headed metal fastener having a driving socket formed in accordance with the subject invention.

Referring more particularly to the drawings wherein the showings are for the purpose of illustrating a preferred embodiment of the invention only, and not for the purpose of limiting same, FIG. 1 shows, in side elevation, a typical threaded metal fastener formed in accordance with the invention and generally comprising an elongated cylindrical shank 12 and an integral metal head 14 of generally cylindrical configuration. As can be appreciated, the actual form of threads 16 on shank 12 are not important to the invention, and any standard thread form could be used, and the shank itself could be of any desired length and diameter relationship. Likewise, the head 14 can be of differing diameter length relationships and can be of different relative diameters as compared to the diameter of shank 12.

The important aspect of the invention is the arrangement of the tool or driver receiving socket configuration formed in head 14. This relationship and the various components which form it can best be understood by reference to FIGS. 2 through 4.

Figure 2:
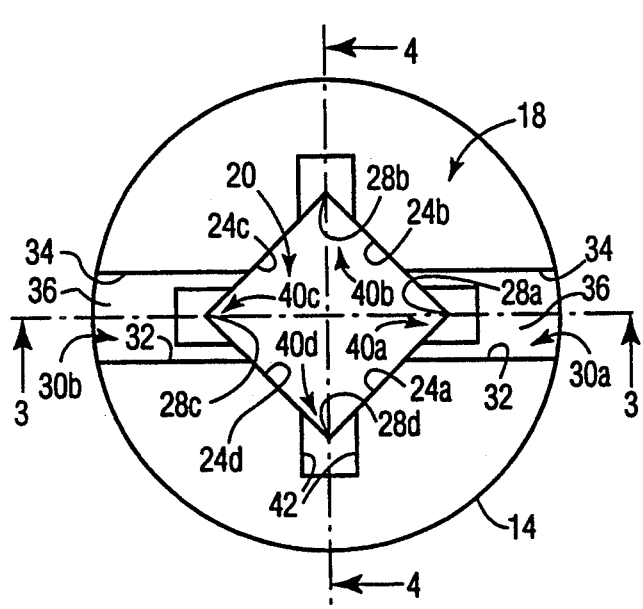
FIG. 2 is an enlarged plan view of the head structure shown in FIG. 1.
Figure 3:
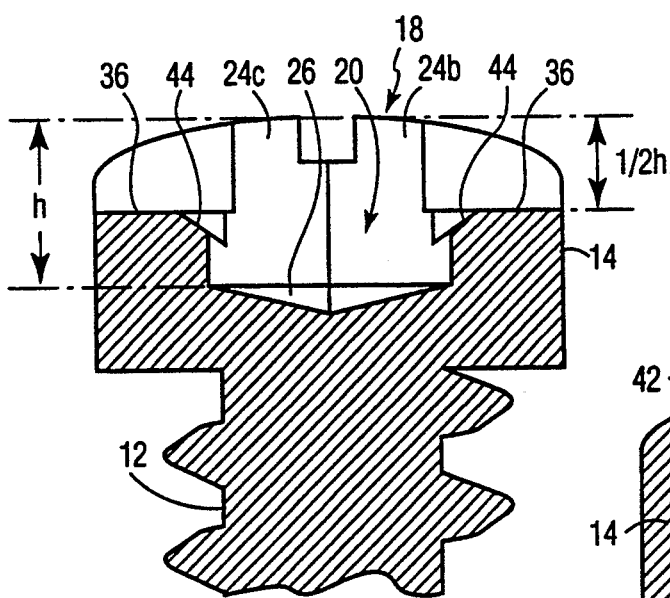
FIG. 3 is a cross-sectional view taken on line 3—3 of FIG. 2.
Figure 4:
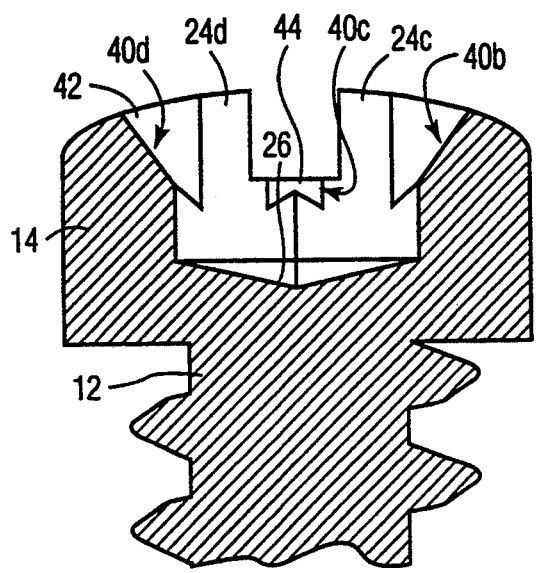
FIG. 4 is a cross-sectional view taken on line 4—4 of FIG. 2.

As shown in FIG. 2, the driving socket 18 generally comprises a square socket recess 20 which is located in alignment with the vertical center line 22 of the stem 12 and head 14. The recess extends axially into the head 14 to a depth h and is defined by four vertically extending side walls 24a through 24d. In the subject embodiment, the bottom 26 of the recess 20 has a very shallow V-shape as best seen in FIGS. 3 and 4.

It should be appreciated that recess 20 is, as noted earlier, sized and arranged so as to receive a standard square socket (Robertson) type driver. This will be discussed subsequently with reference to FIG. 5.

The four vertical walls 24a through 24d meet at four generally vertical and diagonally located corners 28a through 28d. Associated with the diagonally opposite corners 28a and 28c are a pair of aligned slots 30a and 30b, respectively. The slots 30a and 30b extend diagonally from the corners of the square socket recess 20 in the manner shown in FIG. 2 and extend fully to the exterior periphery of the head 14. The slots are arranged for receiving a flat blade screw driver and each slot is defined by a spaced pair of walls 32 and 34. The walls 32 and 34 extend axially into the head to a depth of approximately one-half h and are joined at their lower end by transverse bottom walls 36. By locating the slots 30a and 30b at the corners of the recess 20 in the manner shown, the material available to resist the torque applied through the side walls 34, 32 is greater than would be the case if the slots were located at a different angular orientation relative to the recess 20.

The socket 18 further includes an arrangement to permit it to accept a conventional cross-recess (Phillips) type screw driver. For this reason, the head is provided with four grooves which extend diagonally outwardly from the corners 28a through 28d of recess 20. The grooves indicated generally with the reference numeral 40a through 40d each include inwardly extending pairs of vertical sides 42 which are more closely spaced than the parallel walls 32, 34 which define the slots 36. Each pair of spaced walls 42 is joined at its bottom by an inclined wall (see FIGS. 3 and 4). The bottom walls 44 are inclined at an angle as shown in FIGS. 3 and 4 to generally correspond to the angle on the typical (Phillips) type cross-recess screw driver.

Figure 5:
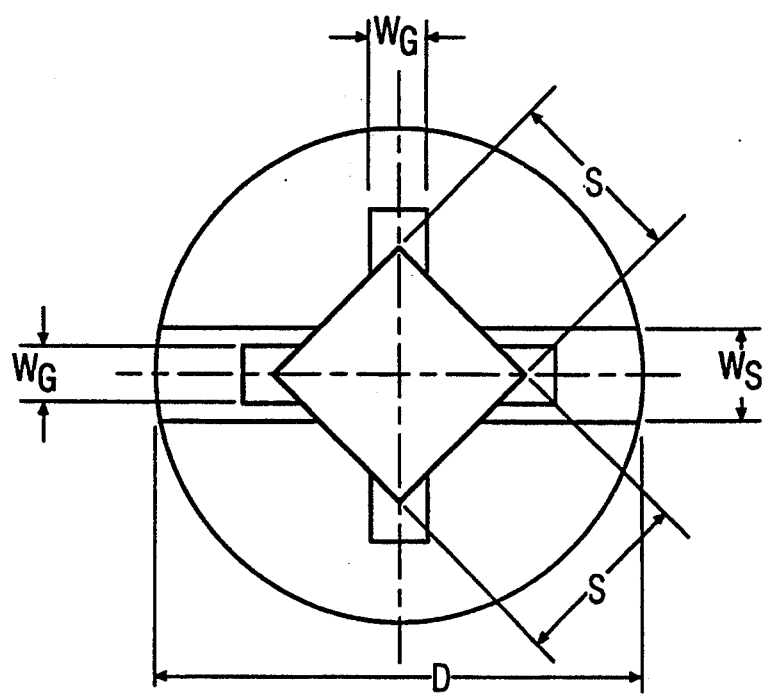
FIGS. 5 and 6 are a plan view and a cross-sectional view similar to FIGS. 2 and 4, respectively, but identifying preferred sizes for a specific head and socket formed in accordance with the subject invention.
Figure 6:
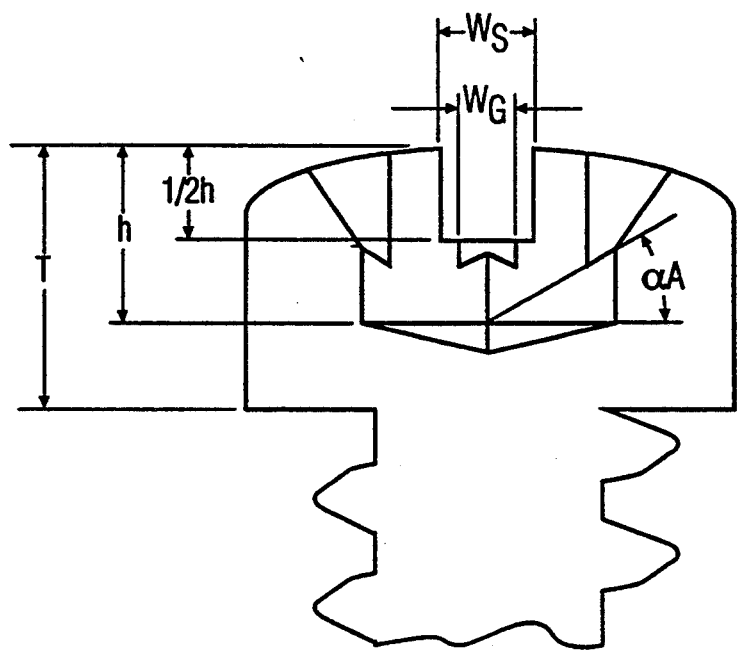

FIG. 5 and the following chart shows the preferred dimensional and angular relationships for a typical size screw head.

|   | Slotted Type 2 Cross Type 2 Square | Slotted Type 2 Cross Type 3 Square |
|---|---|---|
| T | .107/.180 | .207/.237 |
| D | .250/.312 | .389/.414 |
| S | .111/.112 | .131/.133 |
| h | .119 Reference | .119 Reference |
| WS | .045/.060 | .064/.075 |
| WG | .033 Reference | .033 Reference |
| α | 60° | 60° |

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A screw having an elongated threaded body with an axially aligned head including a driving socket capable of receiving a square socket type driver, a cross-recess type screw driver, and a flat blade driver, the driving socket comprising:

a square recess extending axially into the head to a depth h and defined by four vertical walls which meet at four vertical corners, said recess sized and arranged to receive a square type driver;

aligned slots extending radially outwardly in alignment with two diagonally located corners of the square recess for receiving a flat blade driver, each slot being defined by two parallel spaced walls which extend into the head a distance of approximately one-half h to a transverse bottom wall, the vertical walls in each slot being aligned with those in the diagonally opposite slot; and, four grooves extending diagonally outwardly from the corners of the square recess to define a cross-shaped recess to receive a cross-point type screw driver, the grooves each defined by a pair of vertical sides more closely spaced than the parallel walls defining the slots and extending into the head a distance greater than one-half h and than that of the aligned slots but less than h, each groove having an inclined bottom wall joining the sides, and the grooves in the corners from which the diagonal slots extend being located centrally of the slots in the transverse bottom walls thereof.

2. The screw as defined in claim 1 wherein each of the four grooves extend radially outward an equal distance from the center of the head.

3. The screw as defined in claim 2 wherein each of the aligned slots extend radially outwardly to the periphery of the head.

4. The screw as defined in claim 1 wherein the distance between the vertical sides of the grooves is only slightly greater than one-half the distance between the spaced walls of the aligned slots.

5. The screw as defined in claim 4 wherein the bottom walls of the grooves are planar.

6. The screw as defined in claim 5 wherein the planar bottom walls of the grooves if extended toward the bottom of the square recess would intersect at a location above the bottom of the square recess.

* * * * *